United States Patent [19]

Colby et al.

[11] Patent Number: 6,102,968
[45] Date of Patent: Aug. 15, 2000

[54] METHOD FOR AUTOMATICALLY CLOSING OPEN REACTIVE SYSTEMS

[75] Inventors: Christopher Colby, Chicago; Patrice Ismael Godefroid; Lalita Jategaonkar Jagadeesan, both of Naperville, all of Ill.

[73] Assignee: Lucent Technologies Inc., Murray Hill, N.J.

[21] Appl. No.: 09/083,069

[22] Filed: May 21, 1998

[51] Int. Cl.[7] ........................................................ G06F 9/45
[52] U.S. Cl. ..................................... 717/4; 717/7
[58] Field of Search ............................... 395/701, 500.43, 395/709, 704, 707; 707/202

[56] References Cited

U.S. PATENT DOCUMENTS

| | | | |
|---|---|---|---|
| 5,581,750 | 12/1996 | Haderle et al. | 707/202 |
| 5,659,754 | 8/1997 | Grove et al. | 395/709 |
| 5,937,181 | 8/1999 | Godefroid et al. | 395/500.43 |

OTHER PUBLICATIONS

Colby–Godefroid–Jagadeesan, Automatically closing open reactive programs, Apr. 1998, ACM.
Corbett, Constructing compact models of concurrent Java programs, Aug. 1998, ISSTA.
Dwyer–Avrunin–Corbett, Property specification patterns for finite–state verification, Aug. 1998, ACM.
Godefroid–Wolper, A partial approach to model checking, Apr. 1991, IEEE.
Belluomini–Myers, Efficient timing analysis algorithms for timed state space exploration, Jan. 1997, IEEE.
Godefroid–Peled–Staskauskas, Using partial–order methods in the formal validation of industrial concurrent programs, Jul. 1996, IEEE.
Garza–Kim, Transaction Management in an Object–Oriented Database System, Jun. 1–3, 1988, ACM.
Godefroid, Model Checking for Programming Languages using Verisoft, Jan. 15–17, 1997, ACM.

*Primary Examiner*—Anthony Nguyen Ba

[57] ABSTRACT

A unique process, i.e., method, is employed to automatically close an open reactive system. This is realized by employing a unique analysis technique to automatically close the open system by eliminating its interface to its environment. This allows the open system being analyzed to be comprised of either a single sequential process or a set of concurrent processes. The effect of closing the system is to make it executable and amenable to analysis. This is because the resulting closed system simulates the behavior of the original open system in its most general environment. Specifically, this is realized by employing a unique method that transforms an open system into a closed nondeterministic system such that all data values in the open system and its environment that may depend on the behavior of the environment are eliminated in the resulting closed system, and all control-flow choices in the open system and its environment that may depend on these data values are replaced by nondeterministic choices in the closed system. The reactive behavior of the open system and its environment and the resulting closed system, as well as their effect on data values that do not depend on the open system environment, are closely related. For example, every execution of the open system and its environment corresponds to an execution of the resulting closed system that exhibits the same sequence of visible operations and that preserves all data values that do not depend on the open system environment. All deadlocks and all assertion violations in a transition system of the open system and its environment that evaluate only expressions each of whose value does not depend on the open system environment are preserved in a new closed system transition system.

30 Claims, 8 Drawing Sheets

METHOD FOR AUTOMATICALLY CLOSING OPEN REACTIVE SYSTEMS

TECHNICAL FIELD

This invention relates to analyzing implementations of open systems and, more particularly, to the closing of such open systems.

BACKGROUND OF THE INVENTION

An open system is one in which only some of the system components are present. Of particular interest are so-called open concurrent reactive systems. It is important to be able to check the correctness of such open systems. Recently, systematic state-space exploration has been proposed as a tool to effect such checking of the open systems. Tools have evolved that extend systematic state-space exploration to concurrent reactive systems in which processes execute arbitrary code written in general-purpose programming languages, for example, C or C++.

However, such systematic state-space exploration requires that the open system being checked, i.e., analyzed, be "closed", i.e., self-executable. This of course implies that for a particular open reactive system, an executable representation of the environment in which the open system operates has to be available in order to close the system. Heretofore, such a representation of the open system environment was generated manually, which is typically a very difficult, time consuming and error prone task.

The representation of the open system environment, whether generated manually or even automatically, might be too restrictive and, thereby, cause the state-space exploration to miss possible erroneous behavior of the open system being analyzed. On the other hand, the resulting representation of the open system environment might be too general, thereby, increasing the size of the state-space, which may result in yielding spurious erroneous behaviors of the system being analyzed.

SUMMARY OF THE INVENTION

These and other problems and limitations of prior attempts at closing open reactive systems are addressed by employing a unique process, i.e., method, that automatically closes the open reactive system. This is realized by employing a unique analysis technique to automatically close the open system by eliminating its interface to its environment. This allows the open system being analyzed to be comprised of either a single sequential process or a set of concurrent processes. The effect of closing the system is to make it executable and amenable to analysis. This is because the resulting closed system simulates the behavior of the original open system in its most general environment.

Specifically, this is realized by employing a unique method that transforms an open system into a closed nondeterministic system such that all data values in the open system and its environment that may depend on the behavior of the environment are eliminated in the resulting closed system, and all control-flow choices in the open system and its environment that may depend on these data values are replaced by nondeterministic choices in the closed system.

Furthermore, the reactive behavior of the open system and its environment and the resulting closed system, as well as, their effect on data values that do not depend on the open system environment, are closely related. For example, every execution of the open system and its environment corresponds to an execution of the resulting closed system that exhibits the same sequence of visible operations and that preserves all data values that do not depend on the open system environment. All deadlocks and all assertion violations in a transition system of the open system and its environment that evaluate only expressions each of whose value does not depend on the open system environment are preserved in a new closed system transition system.

A technical advantage of this unique method is to automatically close an open system, which then can be automatically analyzed using systematic analysis techniques.

DETAILED DESCRIPTION

A. Theoretical Discussion

1. Background Information

Figure 1:
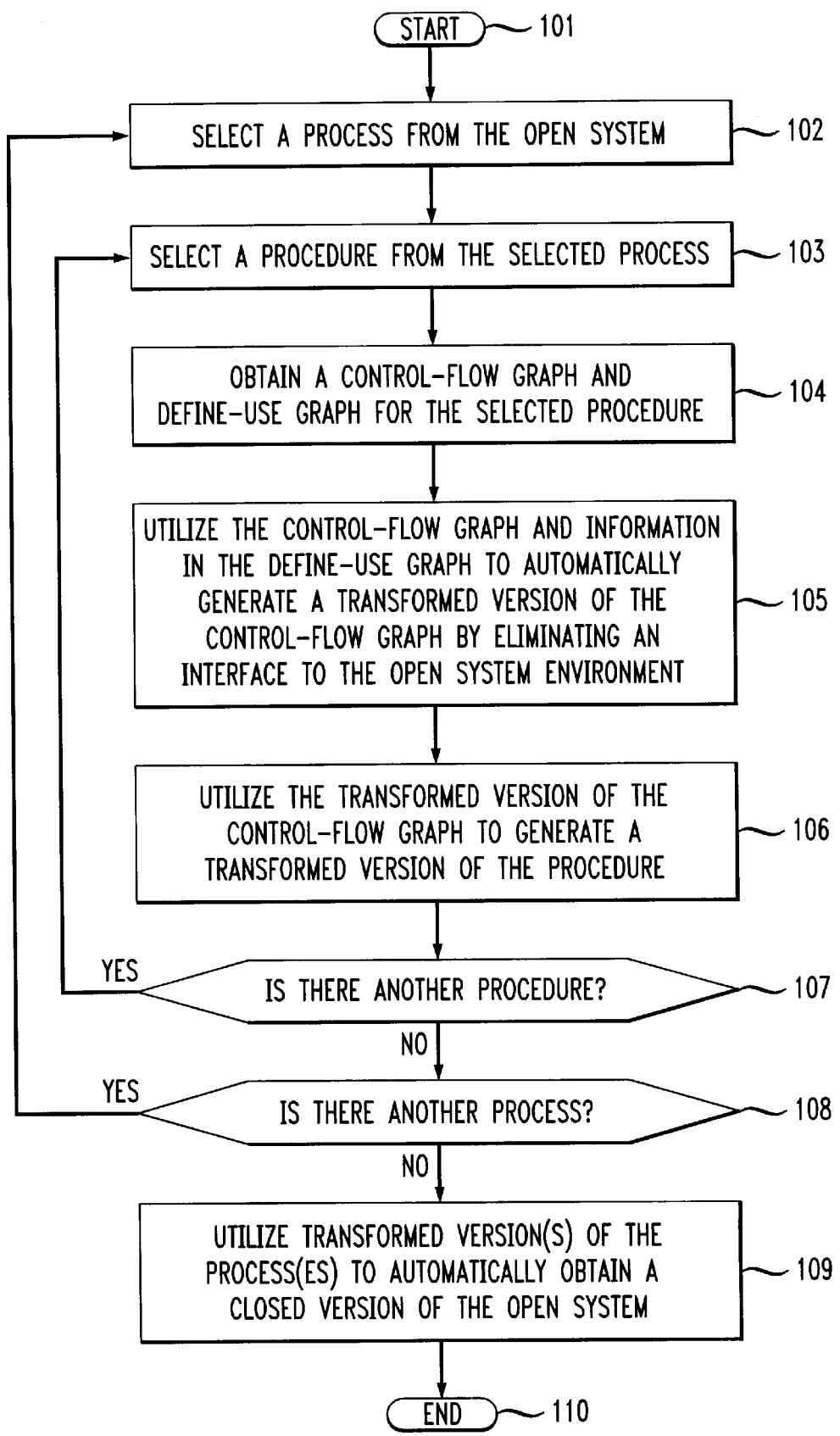
FIG. 1 is a flow chart of a process (method) for automatically closing open reactive systems and includes an embodiment of the invention.

At the outset, it felt best to provide some background information regarding the state-space exploration of open systems. By way of an example, consider a closed concurrent system S composed of a finite set P of processes and a finite set O of communication objects. Each process P∈P executes a sequence of operations, that is described in a sequential program written in a full-fledged programming language, for example, C. Such processes are deterministic: every execution of the process on the same data performs the same sequence of operations. It is assumed that processes only communicate with each other by performing operations on communication objects. A communication object O∈O is defined by a pair (V, OP), where V is the set of all possible values for the object (its domain), and OP is the set of operations that can be performed on the object. Examples of communication objects are shared variables, semaphores, and FIFO buffers. At any time, at most one operation can be performed on a given communication object (operations on a same communication object are mutually exclusive). It is also assumed that the enabledness of any operation on any communication object depends exclusively on the sequence of operations that has been performed on the object in the history of the system, and not on values that are possibly stored or passed through the object, or passed as an argument to the operation. Operations on communication objects are called visible operations, while other operations are by default called invisible. The execution of an operation is said to be blocking if it cannot be completed. It is assumed that only executions of visible operations may be blocking.

At any time, the concurrent reactive open system is said to be in a state. The system is said to be in a "global state" when the next operation to be executed by every process in the system is a visible operation. (A "divergence" is reported when a process does not attempt to execute any visible operation for more than a given (user-specified) amount of time.) It is assumed that every process in the system always eventually attempts to execute a visible operation. This implies that initially, after the creation of all the processes of the system, the system may reach a first and unique global state $s_0$, called the initial global state of the system. A process transition, or transition for short, is defined as one visible operation followed by a finite sequence of invisible operations performed by a single process and such that the next operation to be performed by the given process is a visible one. Let "T" denote the set of all transitions of the system.

A transition is said to be disabled in a global state s when the execution of its visible operation is blocking in s. Otherwise, the transition is said to be enabled in s. A transition "t" that is enabled in a global state s can be executed from s. Since the number of invisible operations in a transition is finite, the execution of an enabled transition always terminates. When the execution of t from s is completed, the program reaches a global state s', called the "successor" of s by t. (Operations on objects (and hence transitions) are deterministic: the execution of a transition t in a state s leads to a unique successor state.) We write $$s \xrightarrow{t} s'$$

to mean that the execution of the transition t leads from the global state s to the global state s', while $$s \xRightarrow{\omega} s'$$

means that the execution of the finite sequence ω of transitions leads from s to s'. If $$s \xRightarrow{\omega} s',$$

s' is said to be reachable from s.

We now define a formal semantics for the concurrent systems that satisfy the above assumptions. A concurrent system as defined here is a closed system: from its initial global state, it can evolve and change its state by executing enabled transitions. Therefore, a very natural way to describe the possible behaviors of such a system is to consider its set of reachable global states and the transitions that are possible between them. Formally, the joint global behavior of all processes in a concurrent system can be represented by a transition system $A_S=(S,\Delta,s_0)$, such that S is the set of global states of the system, $\Delta \subseteq S \times S$ is the transition relation defined such that (s, s')∈Δ iff ∃t∈T:

$$(s, s') \in \Delta \text{ iff } \exists t \in T : s \xrightarrow{t} s',$$

and $s_0$ is the initial global state of the program. (Note "iff" means "if and only if".) An element of Δ corresponds to the execution of a single transition t∈T of the system. The elements of Δ are referred to as global transitions. It is natural to restrict $A_S$ to its global states and transitions that are reachable from $s_0$, since the other global states and transitions play no role in the behavior of the system. In what follows, a "state in $A_S$" denotes a state that is reachable from $s_0$. By definition, states in $A_S$ are global. $A_S$ is called the global state-space of the system.

Because we consider here closed concurrent systems, the environment of one process is formed by the other processes in the system. This implies that, in the case of a single "open" reactive system, the environment in which this system operates has to be represented, possibly using other processes. In practice, a complete representation of such an environment may not be available, or may be very complex. It is then convenient to use a model, i.e., a simplified representation, of the environment to simulate its external behavior. For this purpose, we introduce a "special" operation "VS_toss" to express a valuable feature of modeling languages: "nondeterminism". This operation takes as an argument a positive integer n, and returns an integer in [0, n]. The operation is nondeterministic: the execution of a transition starting with VS_toss(n) may yield up to n +1 different successor states, corresponding to different values returned by VS_toss. Here VS_toss is considered an invisible operation, in order to simplify the following exposition and terminology.

It has been shown that deadlocks and assertion violations can be detected by exploring only the global states of a concurrent system, as defined above. (See, for example, an article by P. Godefroid entitled "Model checking for Programming Languages using VeriSoft", In Proceedings of the 24$^{th}$ ACM Symposium on Principles of Programming Languages, pages 174–186, Paris, January 1997.) Deadlocks are states where the execution of the next operation of every process in the system is blocking. Assertions can be specified by the user with the special operation "VS_assert". This operation can be inserted in the code of any process, and is considered visible. It takes as its argument a boolean expression that can test and compare the value of variables local to the process. When "VS_assert(expression)" is executed, the expression is evaluated. If the expression evaluates to FALSE, the assertion is said to be violated. VeriSoft, as described in the P. Godefroid article noted above, is a tool for systematically exploring the state-space of a concurrent system. In a nutshell, every process of the concurrent system to be analyzed is mapped, in this example, to a UNIX process. The execution of the system processes is controlled by an external process, called the scheduler. This scheduler process observes the visible operations performed by processes inside the system, and can suspend their execution. By resuming the execution of (the next visible operation of) one selected system process in a global state, the scheduler can explore one transition between two global states in the state-space of the concurrent system. By reinitializing the system, the scheduler can explore alternative paths in the state-space. Because states of processes can be very complex (due to pointers, dynamic memory allocation, large data structures of various shapes, recursion, etc.), VeriSoft does not attempt to compute any representation for the reachable states of the system being analyzed, and hence performs a systematic state-space exploration without storing any intermediate states in memory. It has been shown, in the abovenoted P. Godefroid article, that the key to make this approach tractable is to use a new search process built upon existing state-space pruning techniques known as partial-order methods (see, for example, an article by P. Godefroid entitled, "Partial-Order Methods for the Verification of Concurrent Systems—An Approach to the State-Explosion Problem", volume 1032 Lecture Notes in Computer Science, Springer-Verlag, January 1996). For finite acyclic state spaces, this search process is guaranteed to terminate and can be used for detecting deadlocks and assertion violations without incurring the risk of any incompleteness in the verification results. In practice, VeriSoft can be used for systematically and efficiently testing the correctness of any concurrent system, whether or not its state-space is acyclic. Indeed, it can always guarantee, from a given initial state, complete coverage of the state-space up to some depth.

2. Closing Open Systems

Systematic state-space exploration requires the system being analyzed to be closed. Given an open system, an executable representation of its environment has to be provided for closing the system. Consider an open concurrent system S, which can interact with its environment via an interface composed of a set $I_S$ of inputs and a set $O_S$ of outputs. Let $V_i$ denote the set of possible input values that can be provided by the environment to the system S via input i in $I_S$, and let $V_o$ denote the set of possible output values that can be produced by system S to its environment via output o in $O_S$. Closing such an open system means combining the system with an executable representation for its environment. The result of the combination is a self-contained executable system.

Creating an executable representation for the environment of an open system can be a tedious task, because (1) the interface between the system and its environment may be very complex and (2) many possible data values may be provided by the environment. In order to facilitate this task, it is useful to have a method for generating automatically an executable representation of the most general environment in which an open system can operate. Precisely, the most general environment $E_S$ of a system S is defined as the environment that nondeterministically provides any value $v_i$ in $V_i$ whenever the system S takes an input i in $I_S$, and that can take any output o in $O_S$ produced by the system. By construction, the combination of the system S with its most general environment $E_S$ makes it possible to observe all the possible visible behaviors that system S can exhibit. Note that, by definition, there are no dependencies between the input and output values provided and accepted by $E_S$, respectively.

Generating automatically $E_S$ from S would address problem (1) above, but not problem (2): the set of input values provided by $E_S$ can be very large, even infinite, which would yield an untractable state-space search. A better approach is to partition the sets of possible input values provided by $E_S$ into equivalence classes such that values in the same equivalence class would imply exactly the same behavior of S. Of course, partitioning each data domain $V_i$, $i \in I_S$, into such equivalence classes is a very difficult problem, which is undecidable in general. Computing simple conservative approximations for these equivalence classes is possible but requires a sophisticated, and hence more expensive, static analysis of the code describing the system.

Our invention is directed toward an alternative approach: instead of generating an executable representation of the most general environment $E_S$ of an open system S, its interface is eliminated altogether. Specifically, this is realized by a unique method that transforms an open system S into a closed (nondeterministic) system S' such that all data values in $S \times E_S$ that may depend on the behavior of $E_S$ are eliminated in S', and all control-flow choices in $S \times E_S$ that may depend on these data values are replaced by nondeterministic choices in S'. The reactive behavior of $S \times E_S$ and S', as well as their effect on data values that do not depend on $E_S$, are closely related:

Every execution of $S \times E_S$ corresponds to an execution of S' that exhibits the same sequence of visible operations and that preserves all data values that do not depend on $E_S$.

All deadlocks and all assertion violations in $A_{S \times E_S}$ that evaluate only expressions whose value does not depend on $E_S$ are preserved in the new closed system $A_{S'}$.

Our unique method performs a static analysis of the source code executed by the processes P in P of the open system S. Specifically, it is assumed that each process P in P executes a sequence of operations, that is described in a sequential program written in a full-fledged programming language, for example, C. It is also assumed that such a program can be decomposed into a finite collection of procedures $p_j$, which may call each other and includes a unique top-level procedure.

Because open systems are composed of processes and because programs describing processes are composed of procedures, we map the notions of inputs and outputs from the system level to the procedure level as follows. Let $I_j$ and $O_j$ denote the input and output sets of procedure $P_j$, respectively. When a procedure $p_j$ produces an output o in $O_j$ that is taken as input i in $I_k$ by another procedure $P_k$, we will write o=i. By construction, we have:

$I_S = (\cup_j I_j) \setminus (\cup_j O_j)$ and $O_S = \cup_j O_j$.

Examples of input values of a procedure $P_j$ include values passed as an argument to $P_j$ when it is being called, pointers to values used in $P_j$ but set outside of $P_j$, and values returned by procedure calls made in $P_j$.

B. The Method

In this example, it is assumed that an imperative programming language is employed that meets the following general description. A program consists of a sequence of statements of the following type: assignment statements which assign values to memory locations called variables, conditional statements (if-then-else, switch-case, while, for), procedure call statements, and termination statements (return, exit). The programming language also provides basic atomic data structures (e.g., integer, real, boolean), and constructor and selector operations (e.g., records, arrays, pointers) for creating and manipulating data structures built up from the basic data structures. Visible operations are procedure calls of a specific kind. Herein the term variable is used to refer to a memory location in which a value may be stored. Examples of variables are identifiers (program variables), pointers, array elements, mutable record fields and the like. A variable is thus a semantic object rather than a syntactic one.

Every procedure $P_j$ described in a program satisfying the above assumptions can be represented by a control-flow graph $G_j = (N_j, A_j)$, where the set of nodes $N_j$ is the set of statements that appear in the program describing $P_j$;

the set of arcs $A_j \subseteq N_j \times N_j$ is such that $(n,n') \in A_j$ iff the program statement corresponding to n' may be the next one to be executed by $P_j$ after the execution of the program statement corresponding to n.

Each arc (n,n') in $A_j$ is labeled with a boolean expression that specifies when the program statement corresponding to n' is executed after the program statement corresponding to n. For every node n in $N_j$, the boolean expressions that label arcs from n are mutually exclusive, and their disjunction is a tautology. Note that it is assumed that the control flow describing the sequencing of operations performed by a process is completely specified by the procedures $P_j$; interruptions and other preemptive schemes that may violate this assumption are not considered here for simplicity.

Let n be a node of the control-flow graph of some procedure $P_j$ implementing an open system S. A variable v is used in node n if the value of v may be required during some execution of the statement corresponding to n (i.e., the value in the memory location corresponding to v may be read). Similarly, variable v is defined in node n if the value of v may be modified during the execution of the statement corresponding to n (i.e., a value may be written in the memory location corresponding to v). Let V(n) denote the set of variables used in node n. It is assumed that every execution of an assignment statement defines the value of exactly one variable. Conditional and termination statements are also assumed not to defme any variables.

Procedure calls are modeled as follows. It is assumed that each argument of a procedure call is a variable. When the procedure call is executed, a new fresh variable is created for each argument and is initialized (defined) with the value of the corresponding variable passed as an argument.

In addition to the above standard assumptions, it is assumed that, for each input i in $I_j$, it is possible to determine whether i is also in $I_S$. This means that it is possible to determine statically which input values of a procedure $P_j$ may be provided by the environment $E_S$, including indirectly via other procedures. For simplicity and clarity it is assumed that environment $E_S$ is not allowed to define variables that have been previously defined by program S.

For every procedure $P_j$, we also develop a define-use graph $\overline{G}_j = N_j, \overline{A}_j$, where:

the set of nodes $N_j$ is the set of statements that appear in the program describing $P_j$;

the set of arcs : $\overline{A}_j \subseteq N_j \times N_j$ is such that $(n,n') \in \overline{A}_j$ implies that the program statement corresponding to n' uses the value of a variable v defined by the program statement corresponding to n; the arc (n,n') is then labeled with v. Furthermore, if a node n defines a variable v and a node n' uses variable v, and if there is a control-flow path from n to n' in $G_j$ along which v is not defined, then there is an arc (n,n') in $\overline{A}_j$ labeled with v.

Techniques for developing define-use dependencies are known in the art and require solving the aliasing problem.

In this example, our unique inventive method is employed to close an open system by transforming one or more open procedures $P_j$ from one or more open processes in the open system to be transformed. This method is shown in FIG. 1.

Thus, FIG. 1 shows a flow chart of one exemplary embodiment of our inventive method. Specifically, the method is initiated via start step 101. Thereafter, a process in the open system is selected via step 102. Step 103 selects a procedure from the selected process which is to be "transformed". In step 104, a control-flow graph and a define use graph are obtained for the selected procedure. Step 105 utilizes the obtained control-flow graph and information in the define-use graph to automatically generate a transformed version of the obtained control-flow graph by eliminating an interface to the open system environment. Step 106 utilizes the transformed version of the control-flow graph to generate a transformed version of the corresponding procedure. Then, step 107 tests if there is another procedure in the selected process. If the test result in step 107 is YES, control is returned to step 103 and steps 103 through 107 are iterated until step 107 yields a NO result. Then, step 108 tests if there is another process to be transformed in the open system. If the test result in step 108 is YES, control is returned to step 102 and steps 102 through 108 are iterated until step 108 yields a NO result. Then, step 109 utilizes the transformed version(s) of the process(es) to automatically obtain a closed version of the open system. The method is ended via step 110.

The resulting closed version of the open system is then utilized to analyze the correctness of the concurrent system. An analysis tool that may advantageously used to perform this analysis is VeriSoft, noted above.

Figure 2:
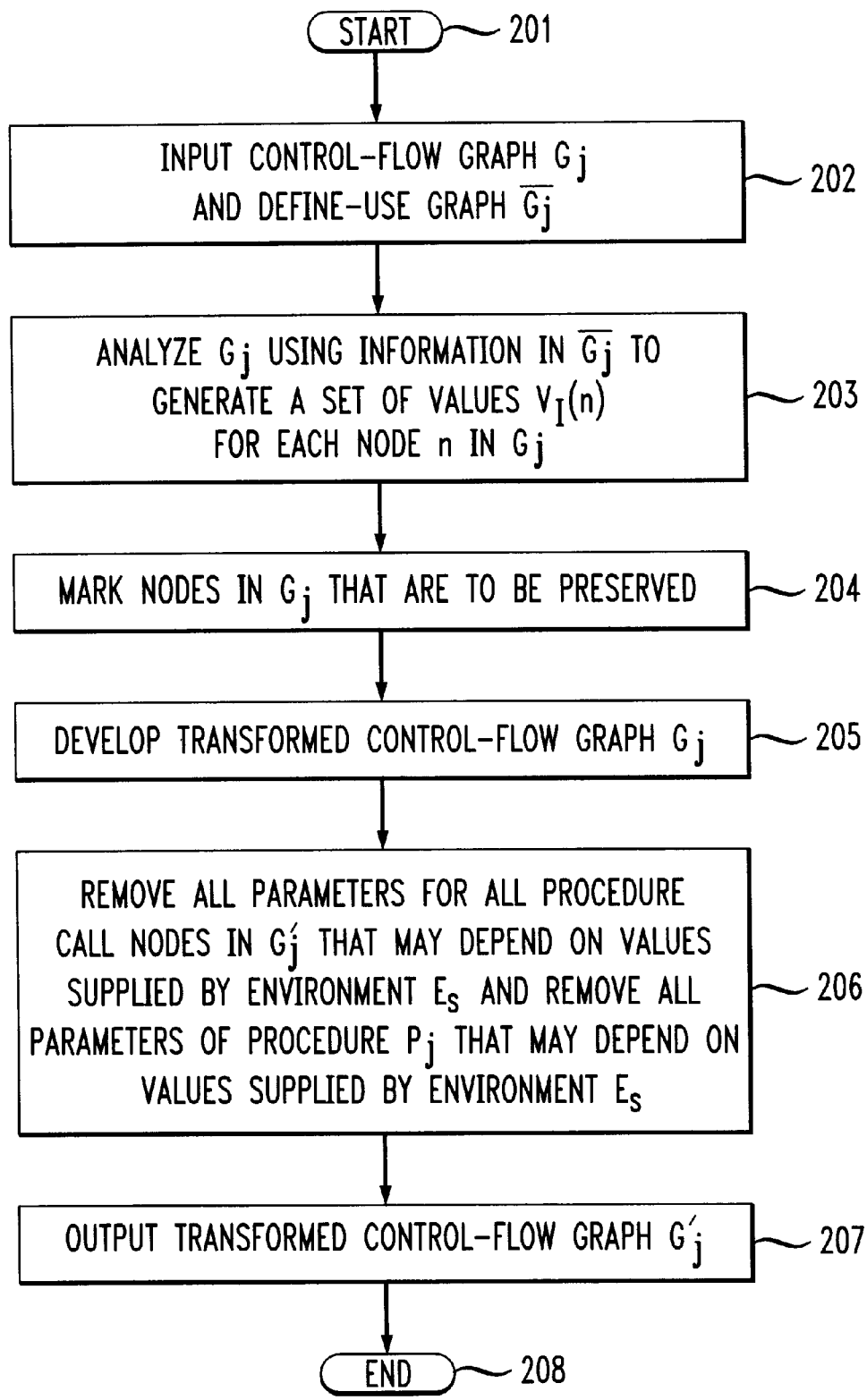
FIG. 2 is a flow chart of a method illustrating an embodiment of the invention for obtaining a transformed version of a control-flow graph for a procedure in a process employed in an open system.

The method of step 105 of FIG. 1 is shown in FIG. 2. It takes as inputs both the control-flow graph Gj and the define-use graph $\overline{G}_j$ of the procedure $P_j$. The method generates a new transformed control-flow graph $G'_j$ by transforming $G_j$ using information extracted from $\overline{G}_j$. From, $G'_j$ it is then relatively straight forward to construct a new procedure $p'_j$ that has $G'_j$ for its control-flow graph. Additionally, the new procedures $p'_j$ are readily employed to form new transformed processes in the closed system.

Referring now to FIG. 2, there is shown a flow chart of one embodiment of the inventive method for generating a transformed version of a control-flow graph. Accordingly, the method is started via step 201 regarding the transformation of a procedure $P_j$. Again, note that the open system is comprised of one or more processes and each process is comprised of one or more procedures. Thereafter, step 202 causes the inputting of control-flow graph $G_j$ and define-use graph $\overline{G}_j$ for procedure $P_j$.

Then, step 203 analyzes control-flow graph $G_j$ using information in the define-use graph $\overline{G}_j$ to generate a set of values $V_j(n)$ for each node n in $G_j$. This is realized as follows:

Analysis of $\overline{G}_j$ to generate a set of values $V_j(n)$ for each node n in $G_j$:

(a) Let $N_{E_S}$ denote the set of nodes in $N_j$ that use a value defined by the environment $E_S$;

(b) generate the set $N_I$ of nodes in $N_j$ that are reachable from a node in $N_{E_S}$ by a (possibly empty) sequence of define-use arcs in $\overline{G}_j$;

(c) For each node n in $N_I$, let $V_j(n)$ denote the set of variables used in n that are defined by $E_S$ or that are labeling an arc leading to n from any node $n' \in N_I$ in $\overline{G}_j$.

Effectively, step 203 determines which program statements of procedure $P_j$ may use (possibly indirectly via other variables) a value defined by the environment $E_S$.

Step 204 marks the nodes in control-flow graph $G_j$ that are to be preserved. This is realized as follows:

Mark the nodes of $G_j$ that are to be preserved according to the following rules:

(a) mark the start node;

(b) mark each node corresponding to a termination statement;

(c) mark each node corresponding to a procedure call of the system;

(d) mark each node n corresponding to an assignment or conditional statement such that n is not in $N_I$.

As indicated, step 204 selects the program statements of procedure $p_j$ that will be preserved in $p'_j$. These include all the procedure calls (which, by definition, include all visible operations) and termination statements, as well as, the assignment and conditional statements that do not use any value provided by $E_S$.

Step 205 develops the transformed control-flow graph $G'_j$. This is realized as follows:

Generate the transformed control-flow graph $G'_j = (N'_j, A'_j)$ for $G_j$ by:

For each node n of $G_j$ marked in Step 204, do the following:

(a) add n to N'$_j$;

(b) for each arc a=(n, n')∈A$_j$, let succ(a) denote the set of marked nodes of G$_j$ that are reachable from by a sequence aω of control-flow arcs in G$_j$ passing through unmarked nodes exclusively and starting with arc a, (1) if |succ(a)|=0, do nothing, (2) if |succ(a)|=1, add an arc in A'$_j$ from n to the node in succ(a) and labeled with the boolean expression labeling arc a, (3) if |succ(a)|>1, create a new node n" corresponding to a conditional statement testing the value of "VS_toss (|succ(a)|−1)"; add an arc in A'$_j$ from n to n" and labeled with the boolean expression labeling arc a; then, for every node n$_k$ ∈succ(a), 0≤k≤(|succ(a)|−1), add an arc in A'$_j$ from n" to n$_k$, and labeled with a boolean expression that is satisfied iff the value returned by the call to VS_toss performed in n" returns k.

Step 205 transforms control-flow graph G$_j$ into new control-flow graph G'$_j$ which simulates, using the nondeterministic VS_toss operation, all the possible effects of the values provided by E$_S$ on the control flow of procedure P$_j$. Step 206 removes all parameters for all procedure call nodes in G'$_j$ that may depend on values supplied by E$_S$ and also removes all parameters of procedure P$_j$ that may depend on values supplied by the environment E$_S$. This is realized as follows:

Perform the following final modifications to G$_j$ to remove all procedure call nodes of P$_j$:

(a) remove the arguments of P$_j$ that are defined by E$_S$;

(b) for each node n in G'$_j$ corresponding to a procedure call to any procedure p$_l$, remove each argument of the procedure call whose corresponding parameter has been removed by (a) when transforming G'$_l$.

Thus, step 206 completes the transformation by removing references to parameters of procedures that may be used to transmit values of variables defined by E$_S$. Note that "variables defined by E$_S$" from the point of view of a procedure include variables v defined in other procedure calls during the executions of nodes n corresponding to assignment statements such that V$_j$(n)≠0, or of nodes n corresponding to procedure calls such that v∈V$_j$(n). Therefore, the existence of a single node n corresponding to a procedure call to P$_j$ such that v∈V$_j$(n) is sufficient to cause (a) of step 206 to remove the parameter of P$_j$ corresponding to v.

Step 207 outputs the transformed control-flow graph G'$_j$ of procedure P$_j$.

The method is ended via step 208.

The overall time complexity of the above method is essentially linear in the size of G$_j$ and $\overline{G}_j$, since the transformation can be performed by a single traversal of the control-flow and define-use graphs. Additionally, step 205 of the method eliminates cyclic paths that traverse exclusively unmarked nodes. Divergences due to such paths are therefore not preserved in G'$_j$.

Figure 3:
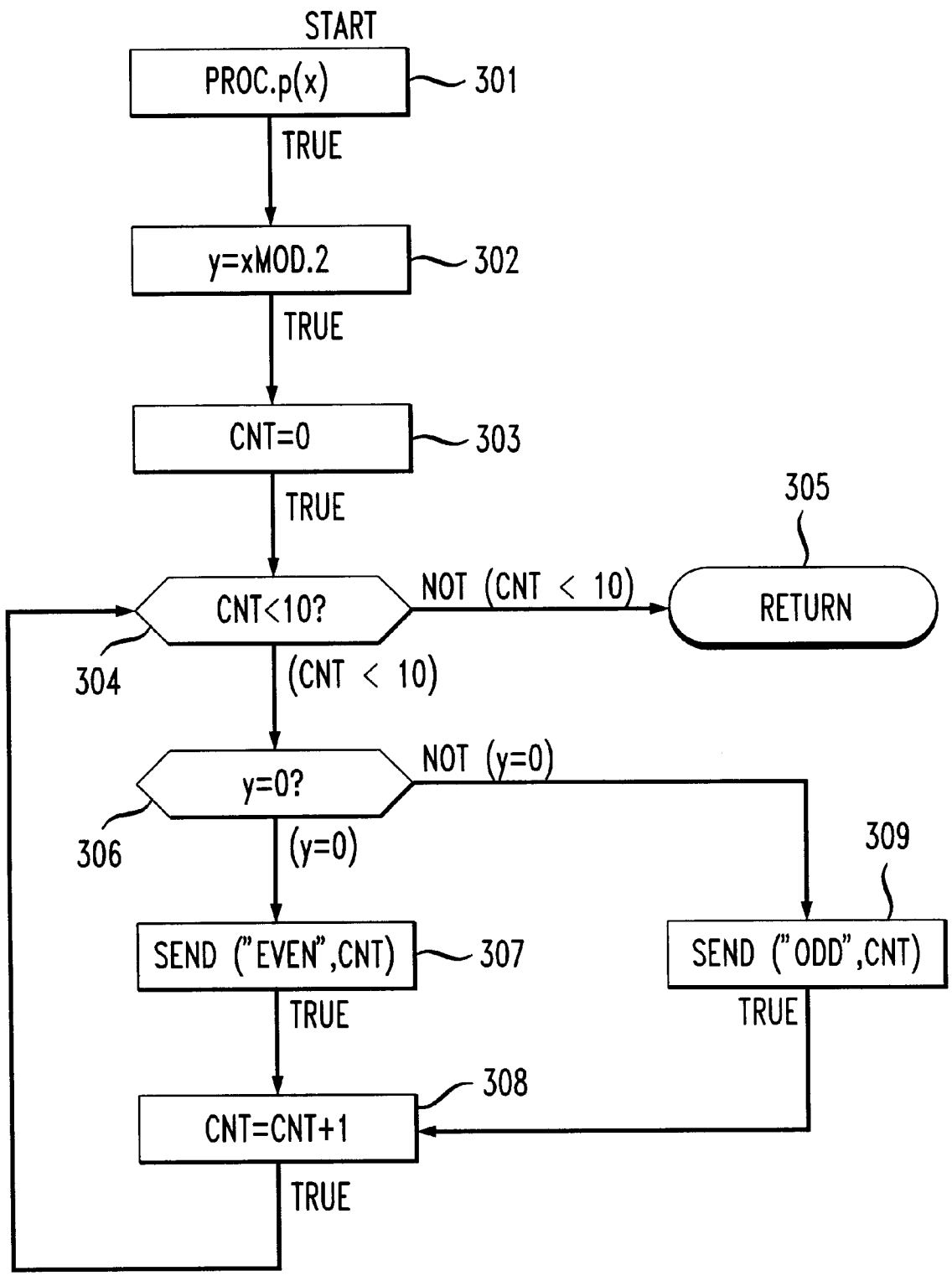
FIG. 3 is a diagram illustrating a control-flow graph for a first procedure in an open system.

FIG. 3 is a diagram illustrating a control-flow graph G$_p$ for first procedure p(x) in an open system. Thus, the control-flow graph starts with step 301 including procedure p(x). Then, control is passed to step 302, where y=x modulo 2. Note that "x" is the only variable defined by the environment. Step 303 starts a counter with CNT=0. Step 304 tests to determine if CNT<10. If the test result in step 304 is NOT(CNT<10), step 305 returns control to the calling procedure. If the test result in step 304 is CNT<10, control is passed to step 306, which tests if y=0. If the test result in step 306 is y=0, control is passed to step 307, which causes the two (2) part message ("EVEN", CNT) to be sent. Thereafter, control is passed to step 308, which increments the count CNT, namely, sets CNT=CNT+1. If the test result in step 306 is NOT(y=0), control is passed to step 309, which causes the two (2) message ("ODD", CNT) to be sent. Thereafter, control is passed to step 308 which increments the count CNT, namely, sets CNT=CNT+1. Control is passed from step 308 to step 304 and steps 304 and 306 through 309 are iterated until step 304 yields a NOT (CNT<10) result and step 305 returns control to the calling procedure.

Figure 4:
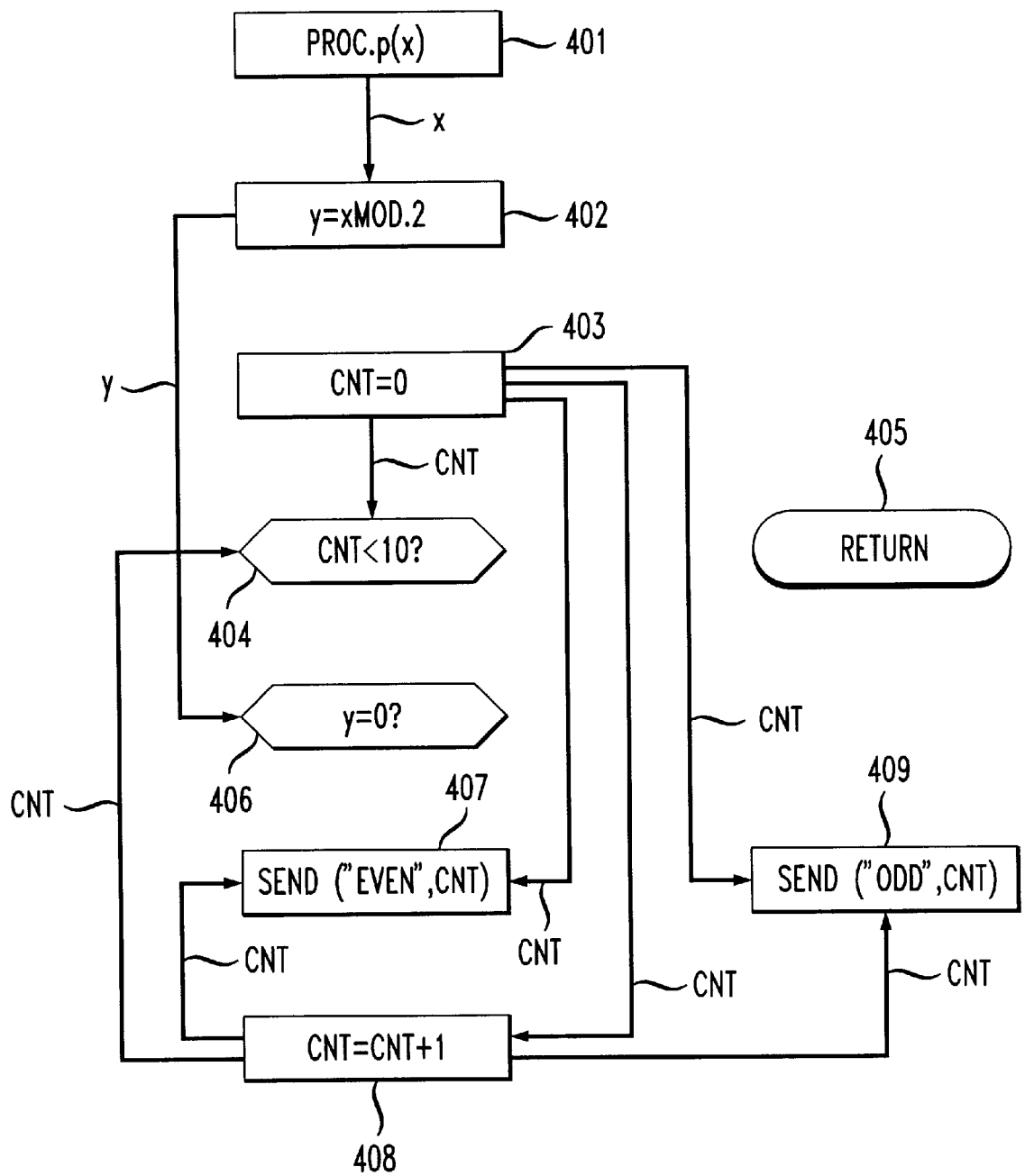
FIG. 4 is a diagram illustrating a define-use graph for the first procedure.

FIG. 4 is a diagram illustrating a define-use graph $\overline{G}_p$ for the first procedure p(x) in the open system. As indicated above a define-use graph provides information regarding the static data dependencies between program statements. The define-use graph of FIG. 4 includes steps 401 through 409. As shown, step 401 including procedure p(x), which provides via an arc x to step 402. Note that x is the only variable defined by the environment. Step 402 includes y=x MOD 2 and supplies y via an arc to step 406. Step 406 includes a test, namely, (y=0?). Step 403 includes a counter set to CNT=0 and supplies CNT via arcs to steps 404, 407, 408 and 409. Step 404 includes a test, namely, (CNT<10?). Step 407 is comprised of the send ("EVEN", CNT) message, while step 409 is comprised of the send ("ODD", CNT) message. Step 408 includes an incremented count CNT, namely, CNT=CNT+1, which incremented CNT is supplied via arcs to steps 404, 407 and 409. Step 405 includes RETURN.

Figure 5:
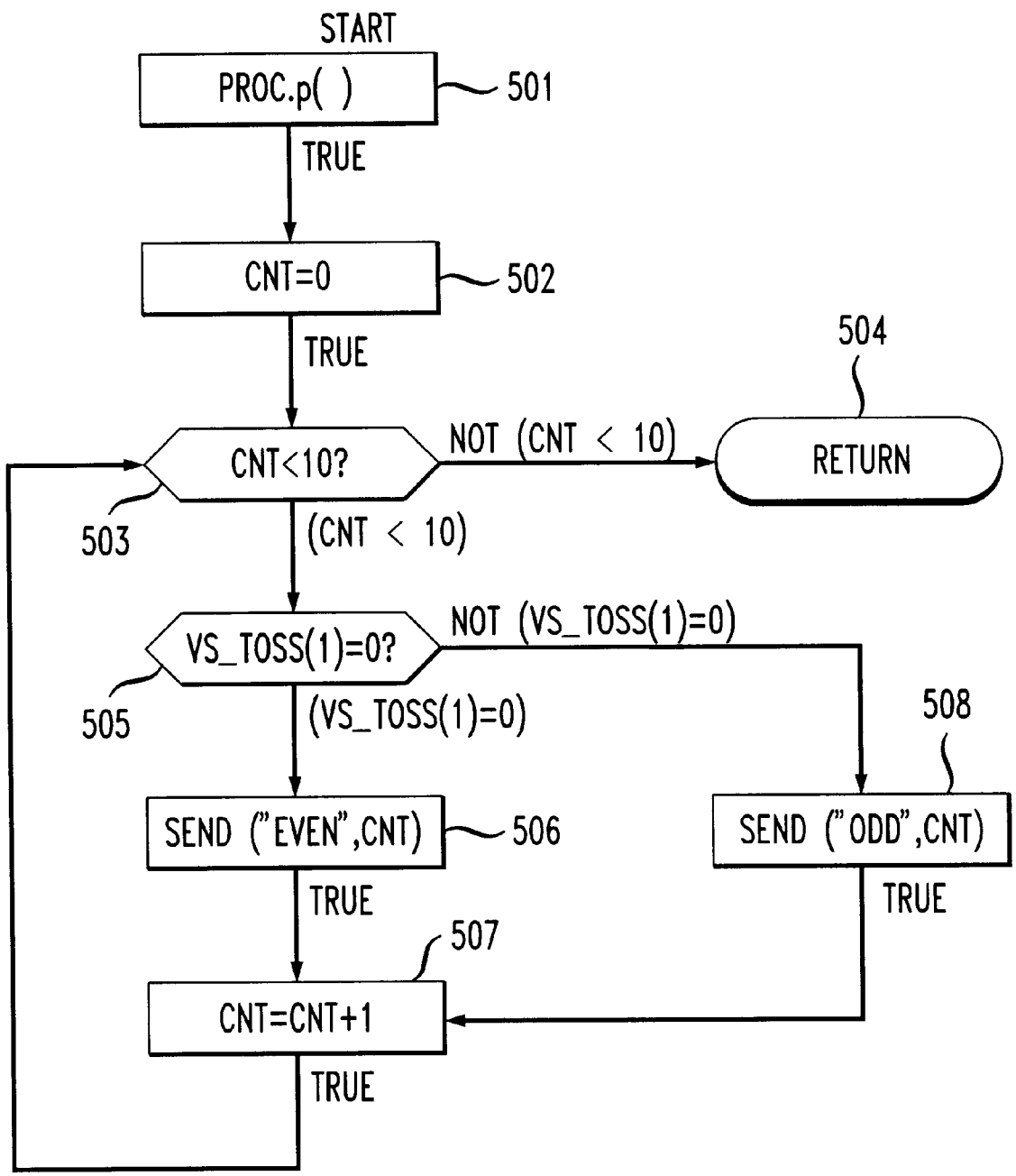
FIG. 5 is a diagram illustrating a resulting transformed control-flow graph generated when applying the embodiment of the invention shown in FIG. 2 to the control-flow graph of FIG. 3 and the define-use graph of FIG. 4 for the first procedure.

FIG. 5 is a diagram illustrating a resulting transformed control-flow graph G'$_p$ (procedure p( )) generated when applying the embodiment of the invention shown in FIG. 2 to the control-flow graph of FIG. 3 and the define-use graph of FIG. 4 for the first procedure p(x) in the open system. The resulting transformed control-flow graph i.e., procedure p( ), starts in step 501. Then, control is passed to step 502, which starts a counter with CNT=0. Step 503 tests to determine if CNT<10. If the test result in step 503 is NOT(CNT<10), step 504 returns control to the calling procedure. If the test result in step 503 is CNT<10, control is passed to step 505, which tests if VS_toss(1)=0. If the test result in step 505 is VS_toss(1)=0, control is passed to step 506, which causes an ("EVEN",CNT) message to be sent. Thereafter, control is passed to step 507 which increments the count, namely, CNT=CNT+1. If the test result in step 505 is NOT(VS_toss(1)=0), control is passed to step 508, which causes an ("ODD", CNT) message to be sent. Thereafter, control is passed to step 507, which increments the count, namely, CNT=CNT+1. Then, control is passed to step 503 and steps 503 and 505 through 508 are iterated until step 503 yields a NOT(CNT<10) result and step 504 returns control to the calling procedure.

Figure 6:
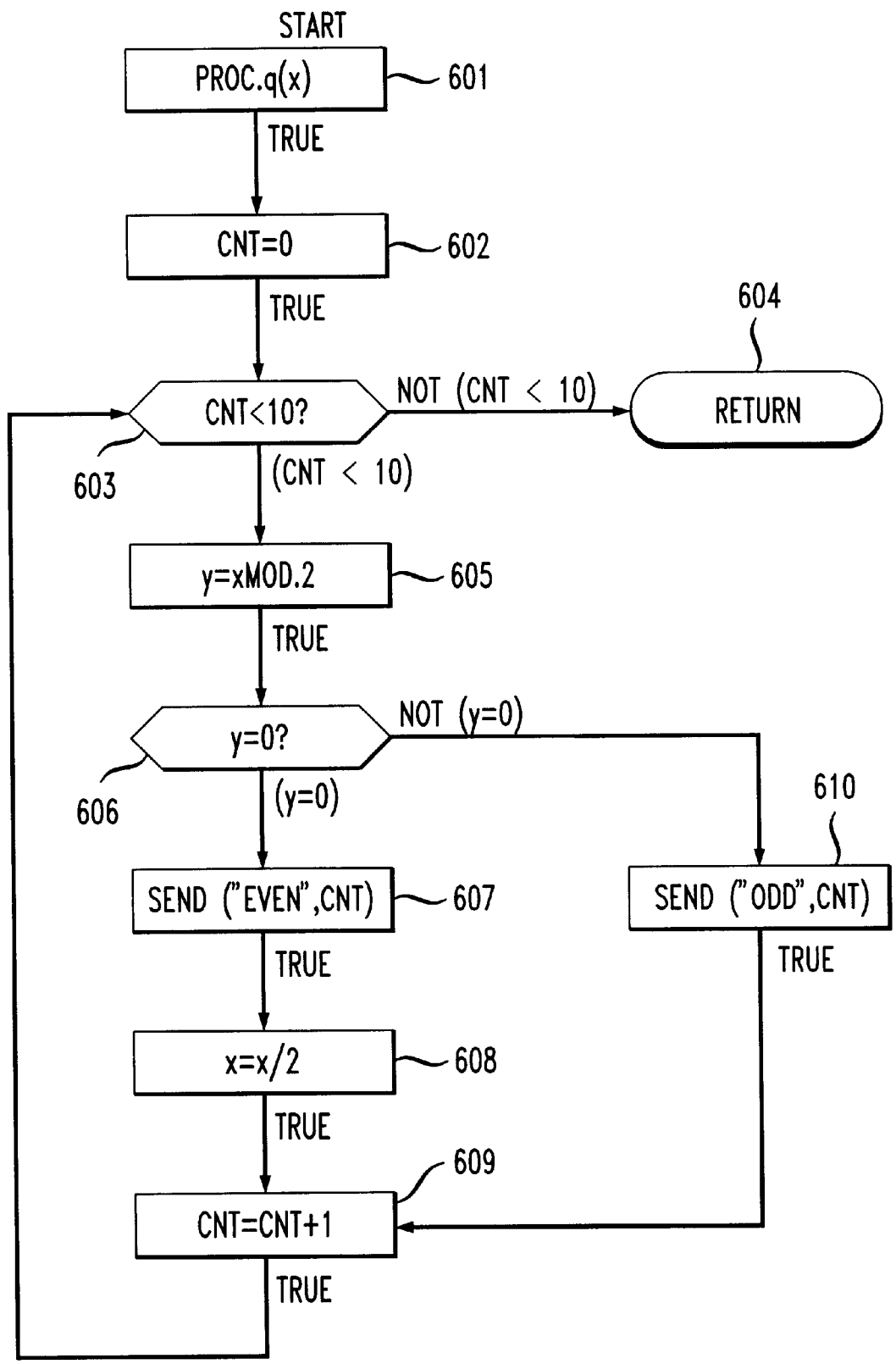
FIG. 6 is a diagram illustrating a control-flow graph of a second procedure in an open system.

FIG. 6 is a diagram illustrating a control-flow graph G$_q$ for second procedure q(x) in the open system. Thus, the control-flow graph starts with step 601 including procedure q(x). Then, control is passed to step 602, which starts a counter with CNT=0. Step 603 tests to determine if CNT<10. If the test result in step 603 is NOT(CNT<10), step 604 returns control to the calling procedure. If the test result in step 603 is CNT<10, control is passed to step 605 where y=x modulo (MOD) 2. Note that "x" is the only variable defined by the environment. Control is passed to step 606, which tests if y=0. If the test result in step 606 is y=0, control is passed to step 607, which causes the two (2) part message ("EVEN", CNT) to be sent. Thereafter, control is passed to step 608, which causes x=x/2. Thereafter, control is passed to step 609, which increments the count CNT, namely, sets CNT=CNT+1. If the test result in step 606 is NOT(y=0), control is passed to step 610, which causes the two (2)

message ("ODD", CNT) to be sent. Thereafter, control is passed to step 609 which increments the count CNT, namely, sets CNT=CNT+1. Control is passed from step 609 to step 603 and steps 603 and 605 through 610 are iterated until step 603 yields a NOT(CNT<10) result and step 604 returns control to the calling procedure.

Figure 7:
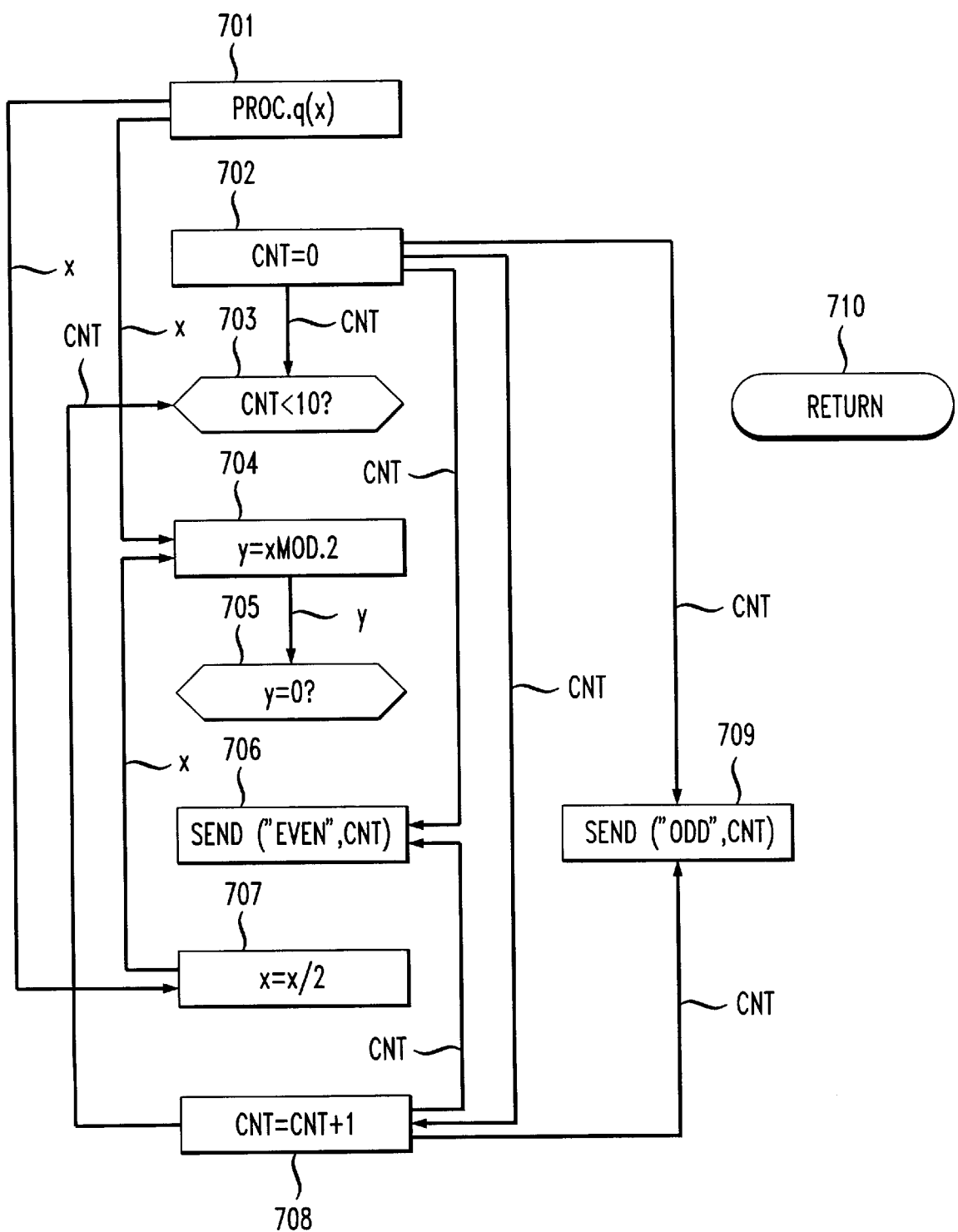
FIG. 7 is a diagram illustrating a define-use graph for the second procedure.

FIG. 7 is a diagram illustrating a define-use graph $\overline{G}_q$ for the second procedure q(x) in the open system. As indicated above a define-use graph provides information regarding the static data dependencies between program statements. The define-use graph of FIG. 7 includes steps 701 through 710. As shown, step 701 includes procedure q(x), which provides x via arcs to steps 704 and 707. Note that x is the only variable defined by the environment. Step 702 includes a counter set to CNT=0 and supplies CNT via arcs to steps 703, 706, 708 and 709. Step 703 includes a test, namely, (CNT<10?). Step 704 includes y=x MOD 2 and supplies y via an arc to step 705. Step 705 includes a test, namely, (y=0?). Step 706 is comprised of the send ("EVEN", CNT) message, while step 709 is comprised of the send ("ODD", CNT) message. Step 707 includes x=x/2 and sends a new value for x via an arc to step 704. Step 708 includes an incremented count CNT, namely, CNT=CNT+1, which incremented count CNT is supplied via arcs to steps 703, 706 and 709. Step 710 includes RETURN.

Figure 8:
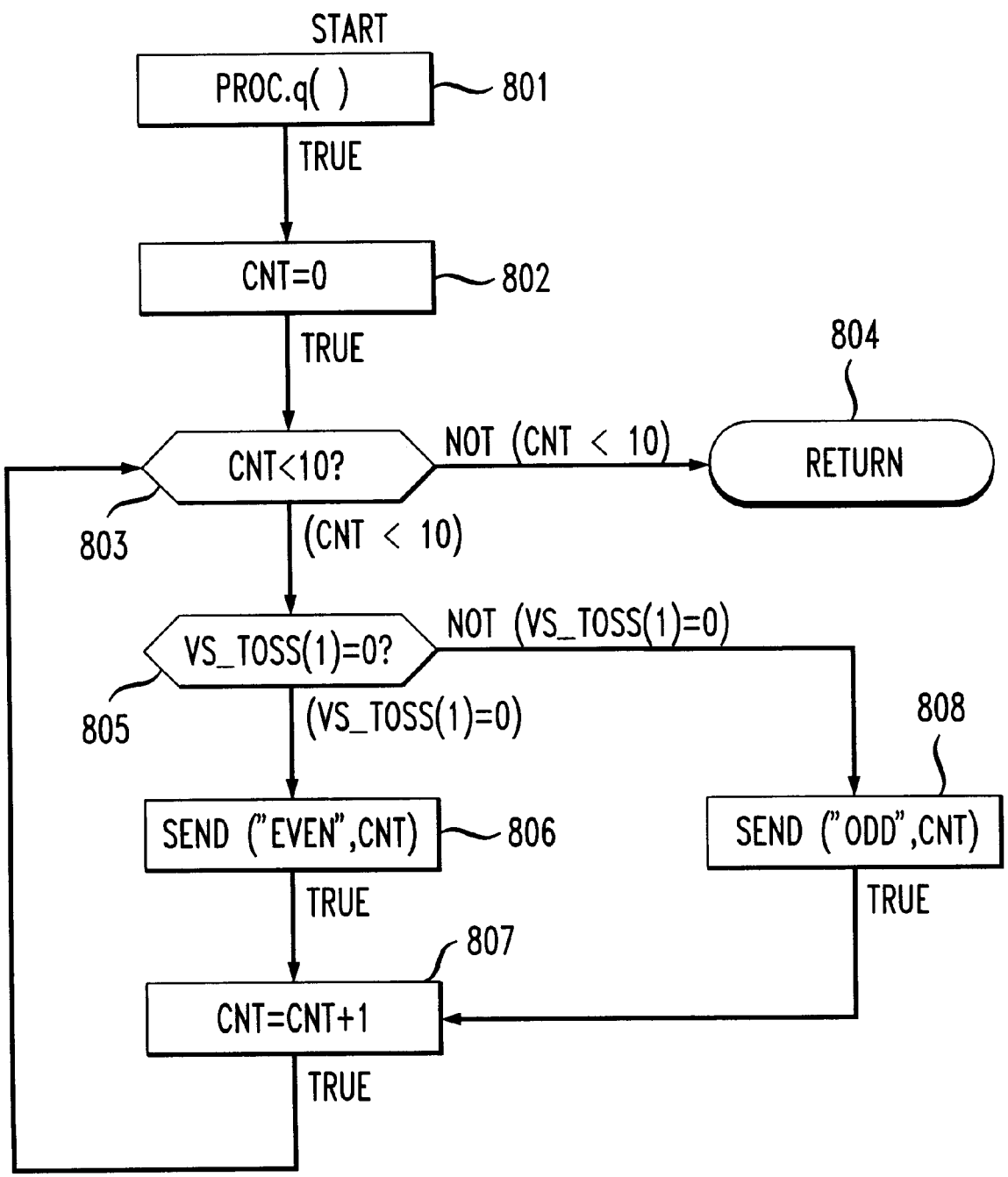
FIG. 8 is a diagram illustrating a resulting transformed control-flow graph generated when applying the embodiment of the invention shown in FIG. 2 to the control-flow graph of FIG. 6 and a define-use graph of FIG. 7 for the second procedure.

FIG. 8 is a diagram illustrating a resulting transformed control-flow graph $G'_q$ (procedure q( )) generated when applying the embodiment of the invention shown in FIG. 2 to the control-flow graph of FIG. 6 and the define-use graph of FIG. 7 for the second procedure q(x) in the open system. The resulting transformed control-flow graph .i.e., procedure q( ), starts in step 801. Then, control is passed to step 802, which starts a counter with CNT=0. Step 803 tests to determine if CNT<10. If the test result in step 803 is NOT(CNT<10), step 804 returns control to the calling procedure. If the test result in step 803 is CNT<10, control is passed to step 805, which tests if VS_toss(1)=0. If the test result in step 805 is VS_toss(1)=0, control is passed to step 806, which causes an ("EVEN",CNT) message to be sent. Thereafter, control is passed to step 807 which increments the count CNT, namely, CNT=CNT+1. If the test result in step 805 is NOT(VS_toss(1)=0), control is passed to step 808, which causes an ("ODD", CNT) message to be sent. Thereafter, control is passed to step 807, which increments the count CNT, namely, CNT=CNT+1. Then, control is passed to step 803 and steps 803 and 805 through 808 are iterated until step 803 yields a NOT(CNT<10) result and step 804 returns control to the calling procedure.

What is claimed is:

1. A method for closing an open system comprising the steps of:
   automatically generating a closed version of the open system including the steps of
      eliminating an interface to an environment of the open system, wherein said interface includes a set of inputs and a set of outputs, and said environment is such as to provide nondeterministically any input value of a set of possible input values whenever said open system takes an input from said set of inputs and that can take any output from said set of outputs produced by said open system; and
      eliminating from the generated closed version data values in the open system that depend on behavior of the environment and replacing flow control choices in the open system that depend on these eliminated data values by nondeterministic choices in the closed version.

2. The method as defined in claim 1 further including a step of analyzing said closed version for the correctness of the corresponding open system.

3. The method as defined in claim 2 wherein said step of analyzing includes a step of performing a static analysis of program source code executed by one or more processes of the open system.

4. The method as defined in claim 1 wherein the open system includes one or more concurrent processes each of which has one or more prescribed procedures and each prescribed procedure has a corresponding control-flow graph and define-use graph, and for each prescribed procedure utilizing its control-flow graph and define-use graph to generate a transformed control-flow graph for the prescribed procedure and employing the transformed control-flow graph to generate a transformed version of the prescribed procedure.

5. The method as defined in claim 4 wherein the control-flow graph includes a plurality of nodes and a plurality of arcs and the define-use graph includes a plurality of nodes and a plurality of arcs, and wherein predetermined relationships of the nodes and arcs in said control-flow graph and in said define-use graph for a prescribed procedure are employed to generate the transformed version of the control-flow chart for the prescribed procedure.

6. The method as defined in claim 1 wherein the open system includes one or more processes each of which has one or more prescribed procedures and each prescribed procedure has a corresponding control-flow graph and define-use graph, wherein said step of eliminating includes for each prescribed procedure utilizing its control-flow graph and information in its define-use graph to eliminate said interface and generate a transformed control-flow graph for the prescribed procedure, and employing the transformed control-flow graph to generate a transformed version of said prescribed procedure.

7. The method as defined in claim 6 wherein the control-flow graph includes a plurality of nodes and a plurality of arcs and the define-use graph includes a plurality of nodes and a plurality of arcs, and wherein predetermined relationships of the nodes and arcs in said control-flow graph and in said define-use graph for a prescribed procedure are employed to generate the transformed version of the control-flow chart for the prescribed procedure.

8. A method employing a computer readable medium embodying computing instructions for closing an open system to be analyzed comprising the steps of:
   automatically generating a closed version of the open system including
   generating a prescribed set of values for each node in a prescribed procedure;
   marking nodes in a predetermined manner in a control-flow graph for the prescribed procedure which are to be preserved in a transformed control-flow graph for the prescribed procedure;
   developing the transformed control-flow graph for the prescribed procedure in accordance with prescribed criteria;
   removing all parameters for the prescribed procedure and for procedure call nodes in the prescribed procedure that depend on values supplied by an environment of the open system; and
   supplying as an output the transformed control-flow graph for the prescribed procedure.

9. The method as defined in claim 8 further including the steps of supplying nodes and arcs of a control-flow graph for the prescribed procedure and supplying of nodes and arcs of a define-use graph for the prescribed procedure.

10. The method as defined in claim 9 wherein said step of generating a prescribed set of values includes analyzing said nodes and arcs of said control-flow graph by use of information of the nodes and arcs in said define-use graph.

11. The method as defined in claim 10 wherein said step of analyzing includes denoting a set of nodes in the control-flow graph that uses a value defined by the open system's environment, generating a set of nodes in the control-flow graph that are reachable from a node in the denoted set of nodes by a sequence, having a length of 0 or more, of define-use arcs in said define-use graph, and for each node in the generated set of nodes denoting a set of variables in the node in said control-flow graph that are defined by said open system environment and/or are labeling a define-use arc leading to the node from a node in the generated set of nodes in the define-use graph.

12. The method as defined in claim 10 wherein said predetermined manner of marking includes marking a start node, marking each node corresponding to a termination statement, marking each node corresponding to a procedure call of the open system, marking each node corresponding to an assignment statement such that the node is not in a set of reachable nodes from a node that uses a value defined by the open system environment by a sequence of define-use arcs in said define-use graph, and marking each node corresponding to a conditional statement such that the node is not in a set of reachable nodes from a node that uses a value defined by the open system environment by a sequence of define-use arcs in said define-use graph.

13. The method as defined in claim 10 wherein said prescribed criteria for developing the transformed control-flow graph includes adding each marked node to a set of nodes in the transformed control-flow graph, and adding nodes corresponding to nondeterministic choices for every path starting from a first prescribed marked node, and a prescribed outgoing labeled arc from the first prescribed marked node, and ending at a second prescribed marked node so that only unmarked nodes are traversed along the paths, wherein the transformed control-flow graph has an arc from the first prescribed marked node to a nondeterministic choice node having the same label as the prescribed outgoing arc, and arcs from the nondeterministic choice node to all second prescribed nodes so that labels on the arcs from the nondeterministic choice node correspond to values supplied as an output by the nondeterministic choice node.

14. The method as defined in claim 10 wherein the step of removing includes removing arguments of said prescribed procedure that are defined by the open system environment, for each node in said transformed control-flow graph corresponding to a procedure call to another prescribed procedure, removing each argument of the procedure call whose corresponding parameter has been removed by the step of removing arguments when transforming to a control-flow graph for another prescribed procedure.

15. The method as defined in claim 10 further including the steps of generating a procedure corresponding to the transformed control-flow graph, employing the procedures to obtain the closed version and analyzing said closed version for the correctness of the corresponding open system.

16. The method as defined in claim 15 wherein said step of analyzing includes a step of performing a static analysis of program source code executed by one or more processes of the open system.

17. A method for closing an open system including one or more processes each of which has one or more prescribed procedures and each prescribed procedure has a corresponding control-flow graph and define-use graph, the method comprising the steps of:

automatically generating a closed version of the open system including supplying nodes and arcs of a control-flow graph for the prescribed procedure and supplying of nodes and arcs of a define-use graph for the prescribed procedure;

generating a prescribed set of values for each node in the prescribed procedure;

marking nodes in a predetermined manner in the control-flow graph for the prescribed procedure which are to be preserved in a transformed control-flow graph for the prescribed procedure;

developing the transformed control-flow graph for the prescribed procedure in accordance with prescribed criteria;

removing all parameters for procedure call nodes in the prescribed procedure that depend on values supplied an environment of the open system; and utilizing the transformed control-flow graph to obtain a transformed version of the prescribed procedure, wherein one or more of the transformed versions of the prescribed procedures are used to form one or more transformed versions of transformed processes in a closed version of the open system.

18. The method as defined in claim 17 wherein said step of generating a prescribed set of values includes analyzing said nodes and arcs of said control-flow graph by use of information of the nodes and arcs in said define-use graph.

19. The method as defined in claim 18 wherein said step of analyzing includes denoting a set of nodes in the control-flow graph that uses a value defined by the open system environment, generating a set of nodes in the control-flow graph that are reachable from a node in the denoted set of nodes by a sequence, having a length of 0 or more, of define-use arcs in said define-use graph, and for each node in the generated set of nodes denoting a set of variables in the node in said control-flow graph that are defined by said open system environment and/or are labeling a define-use arc leading to the node from a node in the generated set of nodes in the define-use graph.

20. The method as defined in claim 18 wherein said predetermined manner of marking includes marking a start node, marking each node corresponding to a termination statement, marking each node corresponding to a procedure call of the open system, marking each node corresponding to an assignment statement such that the node is not in a set of reachable nodes from a node that uses a value defined by the open system environment by a sequence of define-use arcs in said define-use graph, and marking each node corresponding to a conditional statement such that the node is not in a set of reachable nodes from a node that uses a value defined by the open system environment by a sequence of define-use arcs in said define-use graph.

21. The method as defined in claim 18 wherein said prescribed criteria for developing the transformed control-flow graph includes adding each marked node to a set of nodes in the transformed control-flow graph, and adding nodes corresponding to nondeterministic choices for every path starting from a first prescribed marked node, and a prescribed outgoing labeled arc from the first prescribed marked node, and ending at a second prescribed marked node so that only unmarked nodes are traversed along the paths, wherein the transformed control-flow graph has an arc from the first prescribed marked node to a nondeterministic choice node having the same label as the prescribed outgoing arc, and arcs from the nondeterministic choice node to all second prescribed nodes so that labels on the arcs from the nondeterministic choice node correspond to values supplied as an output by the nondeterministic choice node.

22. The method as defined in claim 18 wherein the step of removing includes removing arguments of said prescribed procedure that are defined by the open system environment, for each node in said transformed control-flow graph corresponding to a procedure call to another prescribed procedure, removing each argument of the procedure call whose corresponding parameter has been removed by the step of removing arguments when transforming to a control-flow graph for another prescribed procedure.

23. The method as defined in claim 18 further including the steps of generating a procedure corresponding to the transformed control-flow graph, employing the procedures to obtain the closed version and analyzing said closed version for the correctness of the corresponding open system.

24. The method as defined in claim 23 wherein said step of analyzing includes a step of performing a static analysis of program source code executed by one or more processes of the open system.

25. A method for obtaining a transformed version of a control-flow graph of a procedure in a process employed in an open system comprising the steps of:

supplying nodes and arcs of a control-flow graph for a prescribed procedure;

supplying of nodes and arcs of a define-use graph for the prescribed procedure;

generating a prescribed set of values for each node in said prescribed procedure including analyzing said nodes and arcs of said control-flow graph by use of information of the nodes and arcs in said define-use graph by denoting a set of nodes in the control-flow graph that uses a value defined by the open system's environment, generating a set of nodes in the control-flow graph that are reachable from a node in the denoted set of nodes by a sequence, having a length of 0 or more, of define-use arcs in said define-use graph, and for each node in the generated set of nodes denoting a set of variables in the node in said control-flow graph that are defined by said open system environment and/or are labeling a define-use arc leading to the node from a node in the generated set of nodes in the define-use graph;

marking nodes in a predetermined manner in a control-flow graph for the prescribed procedure which are to be preserved in a transformed control-flow graph for the prescribed procedure;

developing the transformed control-flow graph for the prescribed procedure in accordance with prescribed criteria; and removing all parameters for procedure call nodes in the prescribed procedure that depend on values supplied by an environment of the open system.

26. A method for obtaining a transformed version of a control-flow graph of a procedure in a process employed in an open system comprising the steps of:

supplying nodes and arcs of a control-flow graph for a prescribed procedure;

supplying of nodes and arcs of a define-use graph for the prescribed procedure;

generating a prescribed set of values for each node in said prescribed procedure including analyzing said nodes and arcs of said control-flow graph by use of information of the nodes and arcs in said define-use graph;

marking nodes in a predetermined manner in said control-flow graph for the prescribed procedure which are to be preserved in a transformed control-flow graph for the prescribed procedure, said predetermined manner of marking includes marking a start node, marking each node corresponding to a termination statement, marking each node corresponding to a procedure call of the open system, marking each node corresponding to an assignment statement such that the node is not in a set of reachable nodes from a node that uses a value defined by the open system environment by a sequence of define-use arcs in said define-use graph, and marking each node corresponding to a conditional statement such that the node is not in a set of reachable nodes from a node that uses a value defined by the open system environment by a sequence of define-use arcs in said define-use graph;

developing the transformed control-flow graph for the prescribed procedure in accordance with prescribed criteria; and removing all parameters for procedure call nodes in the prescribed procedure that depend on values supplied by an environment of the open system.

27. A method for obtaining a transformed version of a control-flow graph of a procedure in a process employed in an open system comprising the steps of:

supplying nodes and arcs of a control-flow graph for a prescribed procedure;

supplying of nodes and arcs of a define-use graph for the prescribed procedure;

generating a prescribed set of values for each node in said prescribed procedure including analyzing said nodes and arcs of said control-flow graph by use of information of the nodes and arcs in said define-use graph;

marking nodes in a predetermined manner in said control-flow graph for the prescribed procedure which are to be preserved in a transformed control-flow graph for the prescribed procedure;

developing the transformed control-flow graph for the prescribed procedure in accordance with prescribed criteria, which includes adding each marked node to a set of nodes in the transformed control-flow graph, and adding nodes corresponding to nondeterministic choices for every path starting from a first prescribed marked node, and a prescribed outgoing labeled arc from the first prescribed marked node, and ending at a second prescribed marked node so that only unmarked nodes are traversed along the paths, wherein the transformed control-flow graph has an arc from the first prescribed marked node to a nondeterministic choice node having the same label as the prescribed outgoing arc, and arcs from the nondeterministic choice node to all second prescribed nodes so that labels on the arcs from the nondeterministic choice node correspond to values supplied as an output by the nondeterministic choice node; and removing all parameters for procedure call nodes in the prescribed procedure that depend on values supplied by an environment of the open system.

28. A method for obtaining a transformed version of a control-flow graph of a procedure in a process employed in an open system comprising the steps of:

supplying nodes and arcs of a control-flow graph for a prescribed procedure;

supplying of nodes and arcs of a define-use graph for the prescribed procedure;

generating a prescribed set of values for each node in said prescribed procedure including analyzing said nodes and arcs of said control-flow graph by use of information of the nodes and arcs in said define-use graph;

marking nodes in a predetermined manner in said control-flow graph for the prescribed procedure which are to be preserved in a transformed control-flow graph for the prescribed procedure;

developing the transformed control-flow graph for the prescribed procedure in accordance with prescribed criteria;

removing all parameters for procedure call nodes in the prescribed procedure that depend on values supplied by an environment of the open system, including removing arguments of said prescribed procedure that are defined by the open system environment, for each node in said transformed control-flow graph corresponding to a procedure call to another prescribed procedure, removing each argument of the procedure call whose corresponding parameter has been removed by the step of removing arguments when transforming to a control-flow graph for another prescribed procedure.

29. A method for obtaining a transformed version of a control-flow graph of a procedure in a process employed in an open system comprising the steps of:

supplying nodes and arcs of a control-flow graph for a prescribed procedure;

supplying of nodes and arcs of a define-use graph for the prescribed procedure;

generating a prescribed set of values for each node in said prescribed procedure including analyzing said nodes and arcs of said control-flow graph by use of information of the nodes and arcs in said define-use graph;

marking nodes in a predetermined manner in said control-flow graph for the prescribed procedure which are to be preserved in a transformed control-flow graph for the prescribed procedure;

developing the transformed control-flow graph for the prescribed procedure in accordance with prescribed criteria;

removing all parameters for procedure call nodes in the prescribed procedure that depend on values supplied by an environment of the open system;

generating a procedure corresponding to the transformed control-flow graph; and employing the procedures to obtain a closed version of said control-flow graph and analyzing said closed version for the correctness of the corresponding open system.

30. The method as defined in claim 29 wherein said step of analyzing includes a step of performing a static analysis of program source code executed by one or more processes of the open system.

* * * * *